(12) United States Patent (10) Patent No.: US 9,094,831 B2
Borran et al. (45) Date of Patent: Jul. 28, 2015

(54) ADAPTIVE RESOURCE PARTITIONING IN A WIRELESS COMMUNICATION NETWORK

(71) Applicant: QUALCOMM Incorporated, San Diego, CA (US)

(72) Inventors: Mohammad J. Borran, San Diego, CA (US); Aamod D. Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 13/631,566

(22) Filed: Sep. 28, 2012

(65) Prior Publication Data

US 2013/0039206 A1 Feb. 14, 2013

Related U.S. Application Data

(62) Division of application No. 12/725,117, filed on Mar. 16, 2010, now Pat. No. 8,660,071.

(60) Provisional application No. 61/161,646, filed on Mar. 19, 2009.

(51) Int. Cl.
*G01R 31/08* (2006.01)
*H04W 16/10* (2009.01)
(Continued)

(52) U.S. Cl.
CPC .............. *H04W 16/10* (2013.01); *H04W 48/08* (2013.01); *H04W 48/16* (2013.01); *H04W 72/04* (2013.01)

(58) Field of Classification Search
USPC ......... 370/203, 204–215, 229–240, 241–253, 370/310–337, 395.3, 395.4, 395.41, 395.42, 370/395.5, 395.52, 431–457, 458–463, 370/464–497, 498–522, 523–520, 521–529
See application file for complete search history.

(56) References Cited

U.S. PATENT DOCUMENTS 5,455,821 A 10/1995 Schaeffer et al.
5,491,837 A 2/1996 Haartsen
(Continued)

FOREIGN PATENT DOCUMENTS

CN 1127059 A 7/1996
CN 1138395 A 12/1996
(Continued)

OTHER PUBLICATIONS

International Search Report and Written Opinion—PCT/US2010/028052, International Search Authority—European Patent Office—Oct. 15, 2010.
(Continued)

*Primary Examiner* — Jung-Jen Liu
(74) *Attorney, Agent, or Firm* — Nerrie M. Zohn

(57) ABSTRACT

Techniques for performing adaptive resource partitioning are described. In one design, a node computes local metrics for different possible actions related to resource partitioning to allocate available resources to a set of nodes that includes the node. Each possible action is associated with a set of resource usage profiles for the set of nodes. The node sends the computed local metrics to at least one neighbor node in the set of nodes. The node also receives local metrics for the possible actions from the neighbor node(s). The node determines overall metrics for the possible actions based on the computed local metrics and the received local metrics. The node then determines allocation of the available resources to the set of nodes based on the overall metrics. For example, the node may select the action with the best overall metric and may utilize the available resources based on a resource usage profile for the selected action.

27 Claims, 7 Drawing Sheets

(51) Int. Cl.
*H04W 48/08* (2009.01)
*H04W 48/16* (2009.01)
*H04W 72/04* (2009.01)

(56) References Cited

U.S. PATENT DOCUMENTS

| | | |
|---|---|---|
| 6,516,196 B1 * | 2/2003 | Chen et al. .................... 455/450 |
| 8,346,259 B2 * | 1/2013 | Xie et al. ...................... 455/436 |
| 2002/0111158 A1 * | 8/2002 | Tee ................................ 455/421 |
| 2004/0120290 A1 * | 6/2004 | Makhijani et al. ............ 370/335 |
| 2004/0170136 A1 * | 9/2004 | Woo et al. ..................... 370/320 |
| 2004/0235478 A1 * | 11/2004 | Lindquist et al. ............. 455/440 |
| 2005/0009531 A1 * | 1/2005 | Lindquist et al. .......... 455/452.2 |
| 2005/0153697 A1 * | 7/2005 | Patel .............................. 455/442 |
| 2006/0046767 A1 * | 3/2006 | Hunzinger .................... 455/522 |
| 2006/0182075 A1 | 8/2006 | Brunner et al. |
| 2007/0042784 A1 * | 2/2007 | Anderson ..................... 455/450 |
| 2008/0056184 A1 * | 3/2008 | Green ........................... 370/329 |
| 2008/0119194 A1 | 5/2008 | Kim |
| 2008/0153535 A1 | 6/2008 | Gorokhov et al. |
| 2009/0270109 A1 * | 10/2009 | Helmersson et al. ......... 455/453 |
| 2010/0034151 A1 * | 2/2010 | Alexiou et al. ............... 370/329 |
| 2010/0056170 A1 * | 3/2010 | Lindoff et al. ............. 455/452.1 |
| 2010/0214997 A1 * | 8/2010 | Tao et al. ...................... 370/329 |
| 2010/0238883 A1 | 9/2010 | Borran et al. |
| 2010/0248640 A1 * | 9/2010 | MacNaughtan et al. ... 455/67.11 |
| 2010/0291907 A1 * | 11/2010 | MacNaughtan et al. ... 455/414.1 |
| 2010/0291930 A1 * | 11/2010 | Xie et al. ...................... 455/436 |
| 2011/0039589 A1 * | 2/2011 | Skov ............................. 455/501 |
| 2012/0028665 A1 * | 2/2012 | Kwon et al. .................. 455/501 |
| 2013/0281115 A1 * | 10/2013 | Dupray et al. ............. 455/456.1 |

FOREIGN PATENT DOCUMENTS

| | | |
|---|---|---|
| CN | 1285124 A | 2/2001 |
| DE | 19824140 | 12/1999 |
| EP | 1042935 A1 | 10/2000 |
| EP | 1257092 A1 | 11/2002 |
| JP | H09500778 A | 1/1997 |
| JP | 9507993 A | 8/1997 |
| JP | 2003032268 A | 1/2003 |
| KR | 20040028445 A | 4/2004 |
| KR | 20080045868 A | 5/2008 |
| WO | 9524810 A1 | 9/1995 |
| WO | 9615600 A1 | 5/1996 |

OTHER PUBLICATIONS

Partial International Search Report—PCT/US2010/028052—International Search Authority, European Patent Office, Jun. 29, 2010.
Taiwan Search Report—TW099108242—TIPO—Mar. 17, 2014.

* cited by examiner

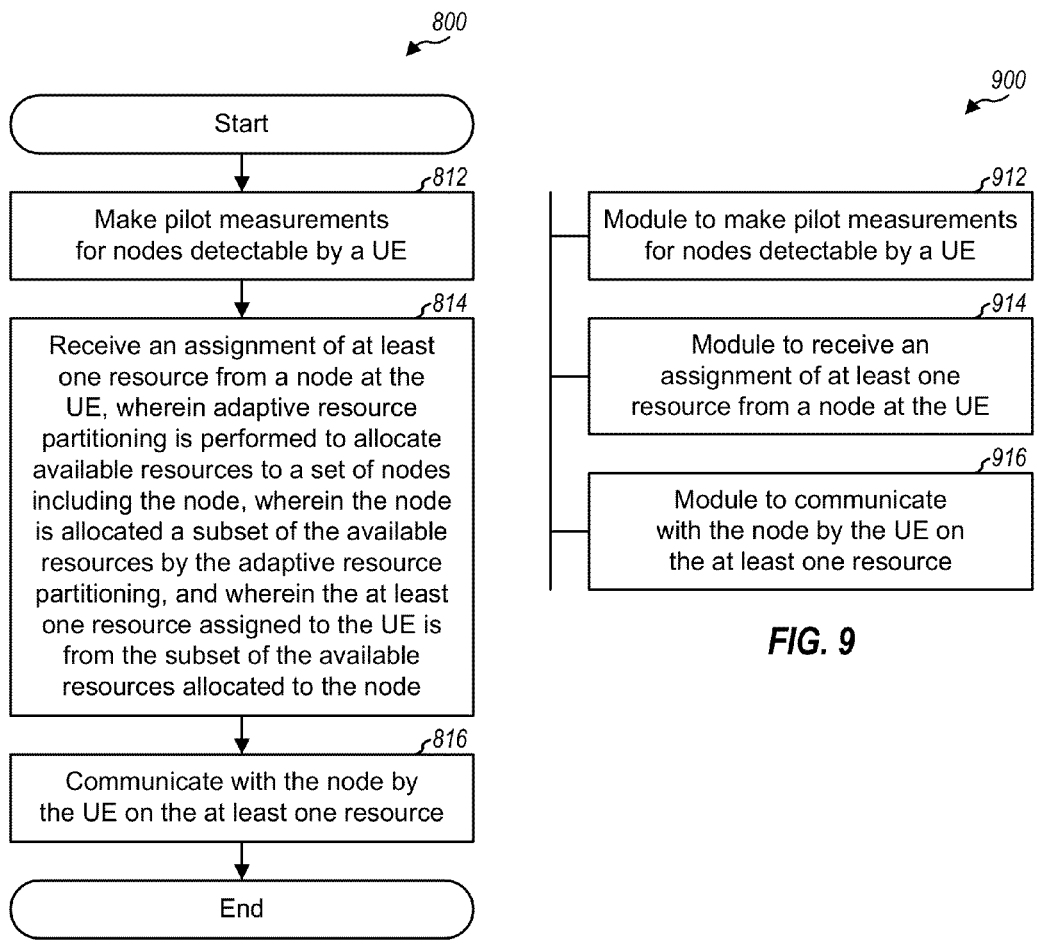

ADAPTIVE RESOURCE PARTITIONING IN A
WIRELESS COMMUNICATION NETWORK

The present application is a Divisional Application of U.S. Ser. No. 12/725,117; filed Mar. 16, 2010, entitled "Adaptive Resource Partitioning in a Wireless Communication Network," which claims priority to provisional U.S. Application Ser. No. 61/161,646, entitled "Utility-Based Resource Coordination for Heterogeneous Networks," filed Mar. 19, 2009, assigned to the assignee hereof and incorporated herein by reference.

BACKGROUND

I. Field

The present disclosure relates generally to communication, and more specifically to techniques for supporting wireless communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data on the downlink to a UE and/or may receive data on the uplink from the UE. On the downlink, a transmission from the base station may observe interference due to transmissions from neighbor base stations. On the uplink, a transmission from the UE may observe interference due to transmissions from other UEs communicating with the neighbor base stations. For both the downlink and uplink, the interference due to interfering base stations and interfering UEs may degrade performance. It may be desirable to mitigate interference in order to improve performance.

SUMMARY

Techniques for performing adaptive resource partitioning in a wireless network are described herein. Resource partitioning refers to a process to allocate available resources to nodes. A node may be a base station, a relay, or some other entity. For adaptive resource partitioning, the available resources may be dynamically allocated to nodes in a manner such that good performance can be achieved.

In one design, adaptive resource partitioning may be performed in a distributed manner by each node in a set of nodes. In one design, a given node in the set of nodes may compute local metrics for a plurality of possible actions related to resource partitioning to allocate available resources to the set of nodes. Each possible action may be associated with a set of resource usage profiles for the set of nodes. Each resource usage profile may indicate allowed usage of the available resources by a particular node, e.g., a list of allowed transmit power spectral density (PSD) levels for the available resources. The node may send the computed local metrics to at least one neighbor node in the set of nodes. The node may also receive local metrics for the plurality of possible actions from the at least one neighbor node. The node may determine overall metrics for the plurality of possible actions based on the computed local metrics and the received local metrics. The node may then determine allocation of the available resources to the set of nodes based on the overall metrics for the plurality of possible actions. In one design, the node may select one of the possible actions based on the overall metrics for these possible actions, e.g., select the possible action with the best overall metric. The node may then utilize the available resources based on a resource usage profile associated with the selected action and applicable for the node. For example, the node may schedule data transmission for at least one UE on the available resources based on the resource usage profile for the node.

Various aspects and features of the disclosure are described in further detail below.

BRIEF DESCRIPTION OF THE DRAWINGS

FIG. 8 shows a process for communicating by a UE.

FIG. 9 shows an apparatus for communicating by a UE.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
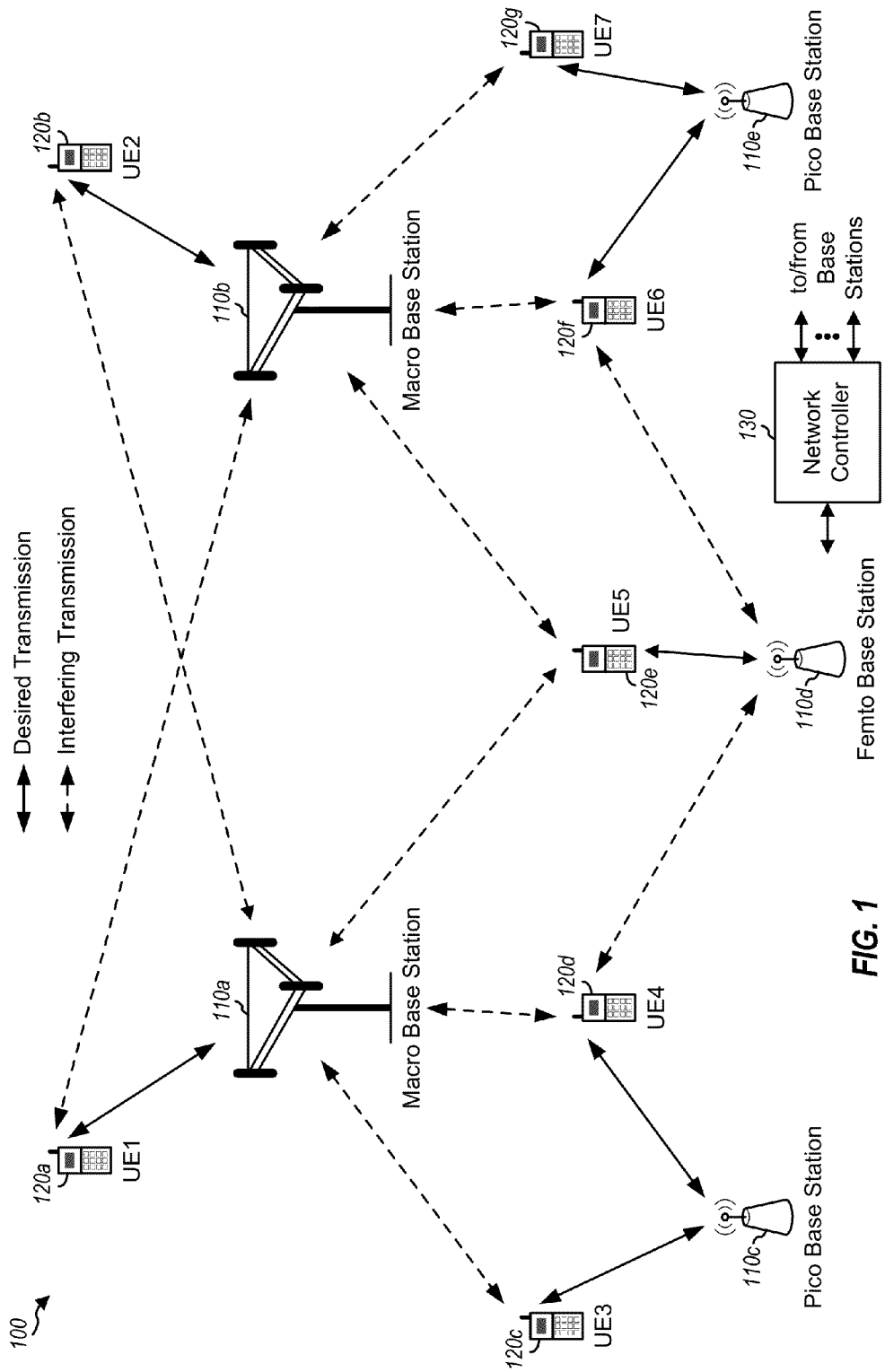
FIG. 1 shows a wireless communication network.

FIG. 1 shows a wireless communication network 100, which may include a number of base stations 110 and other network entities. A base station may be an entity that communicates with UEs and may also be referred to as a node, a Node B, an evolved Node B (eNB), an access point, etc. Each base station may provide communication coverage for a particular geographic area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, wireless network 100 includes macro base stations 110a and 110b for macro cells, pico base stations 110c and 110e for pico cells, and a femto/home base station 110d for a femto cell.

Wireless network 100 may also include relays. A relay may be an entity that receives a transmission of data from an upstream entity (e.g., a base station or a UE) and sends a transmission of the data to a downstream entity (e.g., a UE or a base station). A relay may also be a UE that relays transmissions for other UEs. A relay may also be referred to as a node, a station, a relay station, a relay base station, etc.

Wireless network 100 may be a heterogeneous network that includes base stations of different types, e.g., macro base stations, pico base stations, femto base stations, relays, etc. These different types of base stations may have different transmit power levels, different coverage areas, and different impact on interference in wireless network 100. For example, macro base stations may have a high transmit power level (e.g., 20 Watts or 43 dBm), pico base stations may have a lower transmit power level (e.g., 2 Watts or 33 dBm), and femto base stations may have a low transmit power level (e.g., 0.2 Watts or 23 dBm). Different types of base stations may belong in different power classes having different maximum transmit power levels.

A network controller 130 may couple to a set of base stations and may provide coordination and control for these base stations. Network controller 130 may communicate with base stations 110 via a backhaul. Base stations 110 may also communicate with one another via the backhaul.

UEs 120 may be dispersed throughout wireless network 100, and each UE may be stationary or mobile. A UE may also be referred to as a station, a terminal, a mobile station, a subscriber unit, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with base stations, relays, other UEs, etc.

A UE may be located within the coverage of one or more base stations. In one design, a single base station may be selected to serve the UE on both the downlink and uplink. In another design, one base station may be selected to serve the UE on each of the downlink and uplink. For both designs, a serving base station may be selected based on one or more criteria such as maximum geometry, minimum pathloss, maximum energy/interference efficiency, maximum user throughput, etc. Geometry relates to received signal quality, which may be quantified by a carrier-over-thermal (CoT), a signal-to-noise ratio (SNR), a signal-to-noise-and-interference ratio (SINR), a carrier-to-interference ratio (C/I), etc. Maximizing energy/interference efficiency may entail (i) minimizing a required transmit energy per bit or (ii) minimizing a received interference energy per unit of received useful signal energy. Part (ii) may correspond to maximizing the ratio of channel gain for an intended node to a sum of channel gains for all interfered nodes. Part (ii) may be equivalent to minimizing pathloss for the uplink but may be different for the downlink. Maximizing user throughput may take into account various factors such as the loading of a base station (e.g., the number of UEs currently served by the base station), the amount of resources allocated to the base station, the available backhaul capacity of the base station, etc.

The wireless network may support a set of resources that may be available for transmission. The available resources may be defined based on time, or frequency, or both time and frequency, or some other criteria. For example, the available resources may correspond to different frequency subbands, or different time interlaces, or different time-frequency blocks, etc. A time interlace may include evenly spaced time slots, e.g., every S-th time slot, where S may be any integer value. The available resources may be defined for the entire wireless network.

The available resources may be used by base stations in the wireless network in various manners. In one scheme, each base station may use all of the available resources for transmission. This scheme may result in some base stations achieving poor performance. For example, femto base station 110d in FIG. 1 may be located within the vicinity of macro base stations 110a and 110b, and transmissions from femto base station 110d may observe high interference from macro base stations 110a and 110b. In another scheme, the available resources may be allocated to base stations based on a fixed resource partitioning. Each base station may then use its allocated resources for transmission. This scheme may enable each base station to achieve good performance on its allocated resources. However, some base stations may be allocated more resources than required whereas some other base stations may require more resources than allocated, which may lead to suboptimal performance for the wireless network.

In an aspect, adaptive resource partitioning may be performed to dynamically allocate the available resources to nodes so that good performance can be achieved. Resource partitioning may also be referred to as resource allocation, resource coordination, etc. For adaptive resource partitioning on the downlink, the available resources may be allocated to nodes by assigning each node with a list of transmit PSD levels that can be used by that node on the available resources. Adaptive resource partitioning may be performed in a manner to maximize a utility function. Adaptive resource partitioning is in contrast to fixed or static resource partitioning, which may allocate a fixed subset of the available resources to each node.

In one design, adaptive resource partitioning may be performed in a centralized manner. In this design, a designated entity may receive pertinent information for UEs and nodes, compute metrics for resource partitioning, and select the best resource partitioning based on the computed metrics. In another design, adaptive resource partitioning may be performed in a distributed manner by a set of nodes. In this design, each node may compute certain metrics and may exchange metrics with neighbor nodes. The metric computation and exchange may be performed for one or more rounds. Each node may then determine and select the resource partitioning that can provide the best performance.

Table 1 lists a set of components that may be used for adaptive resource partitioning.

TABLE 1

| Component | Description |
| --- | --- |
| Active Set | A set of nodes maintained for a given UE t and denoted as AS(t). |
| Neighbor Set | A set of nodes maintained for a given node p and denoted as NS(p). |
| Resources | Time and/or frequency resources that may be allocated to nodes. |
| Transmit PSD Levels | A set of transmit PSD levels that may be used for any given resource by a node. |
| Utility Function | A function used to quantify the performance of different possible resource partitioning. |

In one design, an active set may be maintained for each UE and may be determined based on pilot measurements made by the UE and/or pilot measurements made by nodes. An active set for a given UE t may include nodes that (i) have non-negligible contribution to signal or interference observed by UE t on the downlink and/or (ii) receive non-negligible signal or interference from UE t on the uplink. An active set may also be referred to as an interference management set, a candidate set, etc.

In one design, an active set for UE t may be defined based on CoT, as follows:

$$AS(t) = \left\{ q \middle| \frac{P(q) \cdot G(q, t)}{N_0} > CoT_{min} \right\}. \qquad \text{Eq (1)}$$

where P(q) is a transmit PSD of a pilot from node q,

G(q, t) is a channel gain between node q and UE t, $N_0$ is ambient interference and thermal noise observed by UE t, and $CoT_{min}$ is a CoT threshold for selecting nodes to include in the active set.

Equation (1) indicates that a given node q may be included in the active set of UE t if the CoT of node q is greater than $CoT_{min}$. The CoT of node q may be determined based on the transmit PSD of the pilot from node q, the channel gain between node q and UE t, and $N_0$. The pilot may be a low reuse preamble (LRP) or a positioning reference signal, which may be transmitted on resources with low reuse and thus may be detectable far away. The pilot may also be some other type of pilot or reference signal.

The active set of UE t may also be defined in other manners. For example, nodes may be selected based on received signal strength and/or other criteria instead of, or in addition to, received signal quality. The active set may be limited in order to reduce computation complexity for adaptive resource partitioning. In one design, the active set may be limited to N nodes, where N may be any suitable value. The active set may then include up to N strongest nodes with CoT exceeding $CoT_{min}$.

In one design, a neighbor set may be maintained for each node and may include nodes that participate in adaptive resource partitioning. A neighbor set for a given node p may include neighbor nodes that (i) affect UEs served by node p or (ii) have UEs that can be affected by node p. In one design, the neighbor set for node p may be defined as follows:

$$NS(p) = \{q | (\exists t \ni p = S(t) \& q \in AS(t)) | (\exists t \ni q = S(t) \& p \in AS(t))\}, \qquad \text{Eq (2)}$$

where S(t) is a serving node for UE t.

Equation (2) indicates that a given node q may be included in the neighbor set of node p if (i) node q is in an active set of a UE that is served by node p or (ii) node q is a serving node for a UE that has node p in its active set. The neighbor set for each node may thus be defined based on the active sets of UEs and their serving nodes. The neighbor set may also be defined in other manners. Each node may be able to determine its neighbor nodes based on the active sets of UEs served by that node as well as information from the neighbor nodes. The neighbor set may be limited in order to reduce computation complexity for adaptive resource partitioning.

Figure 2:
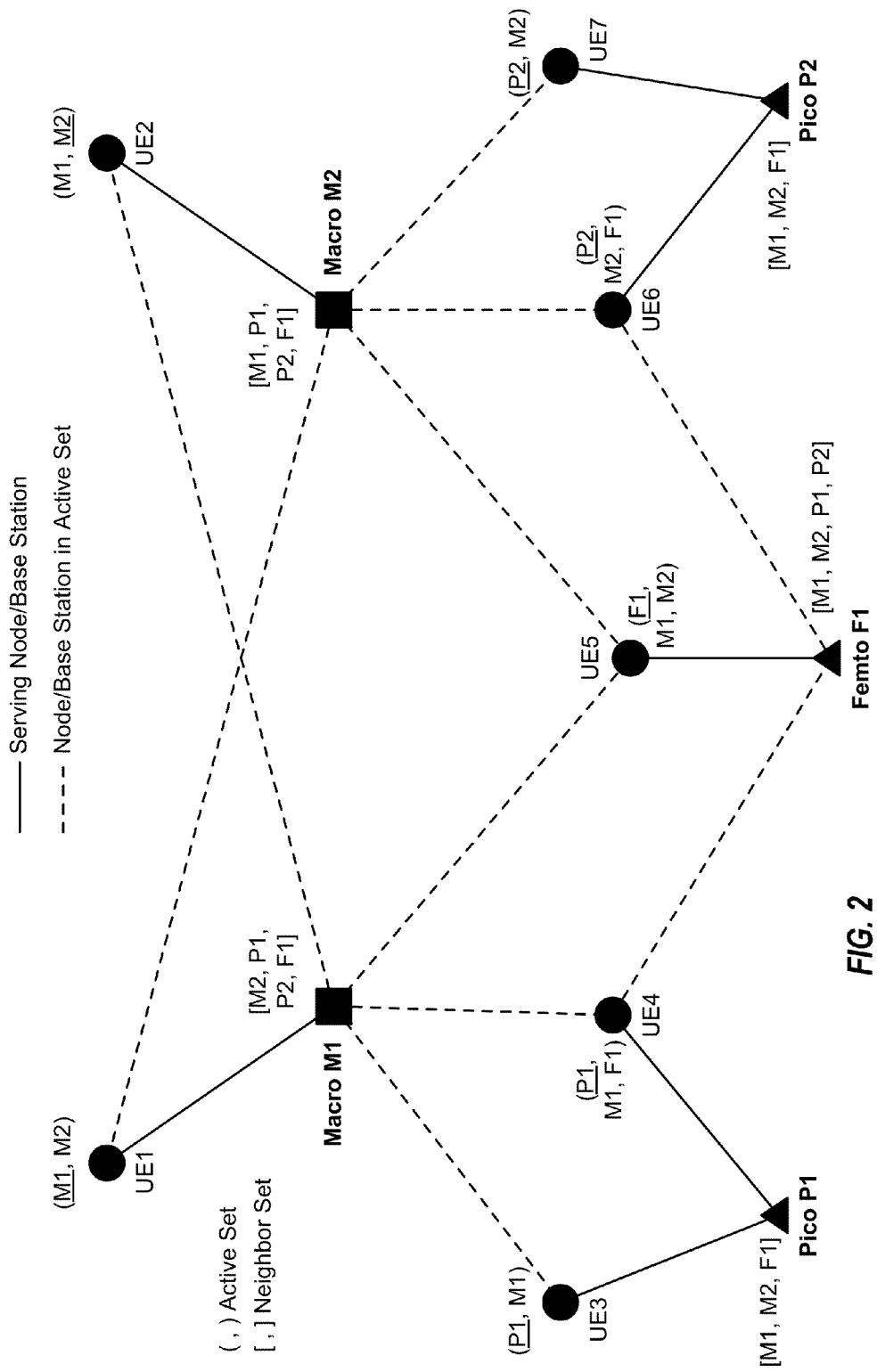
FIG. 2 shows exemplary active sets for UEs and neighbor sets for nodes.

FIG. 2 shows exemplary active sets for UEs and exemplary neighbor sets for nodes in FIG. 1. The active set for each UE is shown within parenthesis next to the UE in FIG. 2, with the serving node/base station being underlined. For example, the active set for UE1 is {M1, M2}, which means that the active set includes serving node M1 and neighbor node M2. The neighbor set for each node is shown within brackets next to the node in FIG. 2. For example, the neighbor set for node M1 is [M2, P1, P2, F1] and includes macro base station M2, pico base stations P1 and P2, and femto base station F1.

In one design, a set of transmit PSD levels may be defined for each node and may include all transmit PSD levels that can be used by the node for each resource. A node may use one of the transmit PSD levels for each resource on the downlink. The usage of a given resource may be defined by the transmit PSD level selected/allowed for that resource. In one design, the set of transmit PSD levels may include a nominal PSD level, a low PSD level, a zero PSD level, etc. The nominal PSD level on all available resources may correspond to the maximum transmit power of the node. The set of transmit PSD levels for the node may be dependent on the power class of the node. In one design, the set of transmit PSD levels for a given power class may be the union of the nominal PSD levels of all power classes lower than or equal to this power class, plus zero PSD level. For example, a macro node may include a nominal PSD level of 43 dBm (for the macro power class), a low PSD level of 33 dBm (corresponding to the nominal PSD level for the pico power class), and a zero PSD level. The set of transmit PSD levels for each power class may also be defined in other manners.

A utility function may be used to compute local metrics and overall metrics for adaptive resource partitioning. The local metrics and overall metrics may be used to quantify the performance of a given resource partitioning. A local metric for a given node p may be denoted as U(p) and may be indicative of the performance of the node for a given resource partitioning. An overall metric for a set of nodes, NS, may be denoted as V(NS) and may be indicative of the overall performance of the set of nodes for a given resource partitioning. A local metric may also be referred to as a node metric, local utility, base station utility, etc. An overall metric may also be referred to as overall utility, neighborhood utility, etc. An overall metric may also be computed for the entire wireless network. Each node may compute the local metrics and overall metrics for different possible actions. The action that maximizes the utility function and yields the best overall metric may be selected for use.

In one design, the utility function may be defined based on a sum of user rates, as follows:

$$U(p) = \sum_{S(t)=p} R(t) \text{ and } V(NS) = \sum_{p \in NS} U(p), \quad \text{Eq (3)}$$

where R(t) is a rate achieved by UE t.

As shown in equation set (3), local metric U(p) for node p may be equal to the sum of rates achieved by all UEs served by node p. Overall metric V(NS) for neighbor set NS may be equal to the sum of the local metrics for all nodes in the neighbor set. The utility function in equation (3) may not provide fairness guarantee.

In another design, the utility function may be defined based on a minimum user rate, as follows:

$$U(p) = \min_{S(t)=p} R(t) \text{ and } V(NS) = \min_{p \in NS} U(p). \quad \text{Eq (4)}$$

As shown in equation set (4), local metric U(p) for node p may be equal to the lowest rate achieved by all UEs served by node p. Overall metric V(NS) for neighbor set NS may be equal to the minimum of the local metrics for all nodes in the neighbor set. The utility function in equation (4) may ensure equal grade of service (GoS) for all UEs, may be less sensitive to outliers, but may not provide trade off between fairness and sum throughput. In another design, an X % rate utility function may be defined in which local metric U(p) for node p may be set equal to the highest rate of the lowest X % of all UEs served by node p, where X may be any suitable value.

In yet another design, the utility function may be defined based on a sum of log of user rates, as follows:

$$U(p) = \sum_{S(t)=p} \log R(t) \text{ and } V(NS) = \sum_{p \in NS} U(p). \quad \text{Eq (5)}$$

As shown in equation set (5), local metric U(p) for node p may be equal to the sum of the log of the rates of all UEs served by node p. Overall metric V(NS) for neighbor set NS may be equal to the sum of the local metrics for all nodes in the neighbor set. The utility function in equation (5) may provide proportional fair scheduling.

In yet another design, the utility function may be defined based on a sum of log of log of user rates, as follows:

$$U(p) = \sum_{S(t)=p} \log\{\log R(t)\} \text{ and } V(NS) = \sum_{p \in NS} U(p). \quad \text{Eq (6)}$$

As shown in equation set (6), local metric U(p) for node p may be equal to the sum of the log of the log of the rates of all UEs served by node p. Overall metric V(NS) for neighbor set NS may be equal to the sum of the local metrics for all nodes in the neighbor set. The utility function in equation (6) may account for contributions from each UE and may have more emphasis on tail distribution.

In yet another design, the utility function may be defined based on a sum of $-1/(\text{user rate})^3$, as follows:

$$U(p) = \sum_{S(t)=p} \frac{-1}{R(t)^3} \text{ and } V(NS) = \sum_{p \in NS} U(p). \quad \text{Eq (7)}$$

As shown in equation set (7), local metric U(p) for node p may be equal to the sum of minus one over the cube of the rates of all UEs served by node p. Overall metric V(NS) for neighbor set NS may be equal to the sum of the local metrics for all nodes in the neighbor set. The utility function in equation (7) may be more fair than proportional fair metric.

Equation sets (3) through (7) show some exemplary designs of the utility function that may be used for adaptive resource partitioning. The utility function may also be defined in other manners. The utility function may also be defined based on other parameters instead of rate or in addition to rate. For example, the utility function may be defined based on a function of rate, latency, queue size, etc.

For the designs shown in equation sets (3) through (7), the local metric for each node may be computed based on the rates of UEs served by that node. In one design, the rate of each UE may be estimated by assuming that the UE is assigned a fraction of each available resource. This fraction may be denoted as $\alpha(t, r)$ and may be viewed as the fraction of time during which resource r is assigned to UE t. The rate for UE t may then be computed as follows:

$$R(t) = \sum_r \alpha(t, r) \cdot SE(t, r) \cdot W(r), \quad \text{Eq (8)}$$

where SE(t, r) is the spectral efficiency of UE t on resource r, and

W(r) is the bandwidth of resource r.

The spectral efficiency of UE t on resource r may be determined as follows:

$$SE(t, r) = C\left(\frac{PSD(p, r) \cdot G(p, t)}{N_0 + \sum_{q \neq p} PSD(q, r) \cdot G(q, t)}\right), \quad \text{Eq (9)}$$

where PSD(p, r) is the transmit PSD of serving node p on resource r,

PSD(q, r) is the transmit PSD of neighbor node q on resource r,

G(p, t) is the channel gain between serving node p and UE t, and

C( ) denotes a capacity function.

In equation (9), the numerator within the parenthesis denotes the desired received power from serving node p at UE t. The denominator denotes the total interference from all neighbor nodes as well as $N_0$ at UE t. The transmit PSD used by serving node p on resource r and the transmit PSD used by each neighbor node on resource r may be known. The channel gains for serving node p and the neighbor nodes may be obtained based on pilot measurements from UE t. $N_0$ may be measured/estimated at UE t and included in the computation, or may be reported by UE t to the wireless network (e.g., to serving node p), or may be ignored (e.g., when the computation is done at node p). The capacity function may be a constrained capacity function, an unconstrained capacity function, or some other function.

A pre-scheduler may maximize the utility function over the space of the $\alpha(t, r)$ parameters, as follows:

$$\text{maximize } U(p), \text{ for } 0 \leq \alpha(t, r) \leq 1 \text{ and } \sum_t \alpha(t, r) \leq 1, \quad \text{Eq (10)}$$

and $$U(p) = f(\{R(t)\}_{S(t)=p}), \quad \text{Eq (11)}$$

where f( ) denotes a concave function of rates for all UEs served by node p. Equation (10) shows a convex optimization on the $\alpha(t, r)$ parameters and may be solved numerically. The pre-scheduler may perform scheduling forecast and may be different from an actual scheduler, which may maximize a marginal utility in each scheduling interval.

The rate for UE t may be constrained as follows:

$$R(t) \leq R_{max}(t) \quad \text{Eq (12)}$$

where $R_{max}(t)$ is the maximum rate supported by UE t.

The overall rate R(p) for node p may be constrained as follows:

$$R(p) = \sum_{S(t)=p} R(t) \leq R_{BH}(p), \quad \text{Eq (13)}$$

where $R_{BH}(p)$ is a backhaul rate for node p. The backhaul rate may be sent to neighbor nodes via the backhaul and/or may be sent over the air for decisions to select serving nodes for UEs.

In one design, an adaptive algorithm may be used for adaptive resource partitioning. The algorithm is adaptive in that it can take into consideration the current operating scenario, which may be different for different parts of the wireless network and may also change over time. The adaptive algorithm may be performed by each node in a distributed manner and may attempt to maximize the utility function over a set of nodes or possibly across the entire wireless network.

Figure 3:
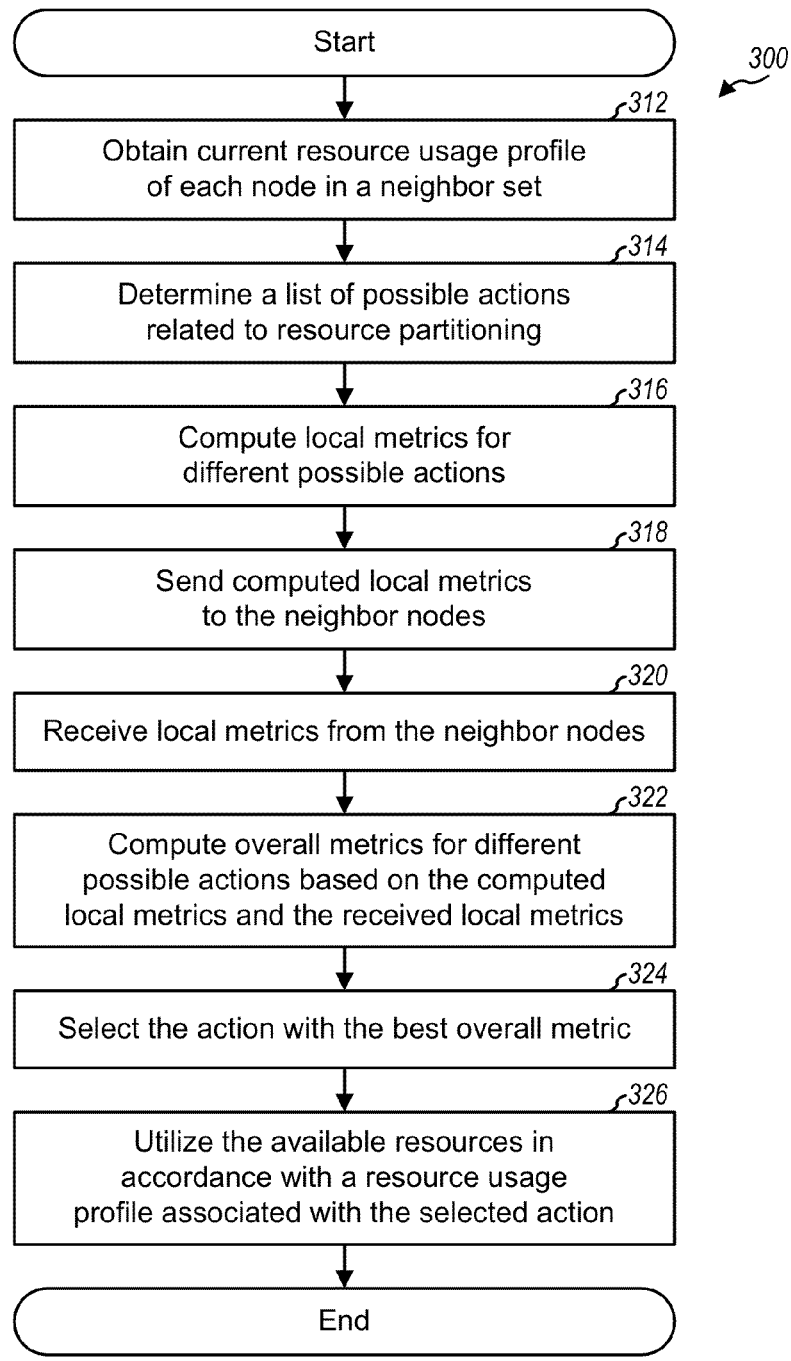
FIG. 3 shows a process for performing adaptive resource partitioning.

FIG. 3 shows a design of a process 300 for performing adaptive resource partitioning. Process 300 may be performed by each node in a neighbor set for a distributed design. For clarity, process 300 is described below for node p. Node p may obtain the current resource usage profile of each node in the neighbor set (step 312). For the downlink, a resource usage profile for a node may be defined by a set of transmit PSD levels, one transmit PSD level for each available resource. Node p may obtain the current resource usage profiles of the neighbor nodes via the backhaul or through other means.

Node p may determine a list of possible actions related to resource partitioning that can be performed by node p and/or neighbor nodes (step 314). Each possible action may correspond to a specific resource usage profile for node p as well as a specific resource usage profile for each neighbor node in the neighbor set. For example, a possible action may entail node p changing its transmit PSD on a particular resource and/or a neighbor node changing its transmit PSD on the resource. The list of possible actions may include (i) standard actions that may be evaluated periodically without any explicit request and/or (ii) on-demand actions that may be evaluated in response to requests from neighbor nodes. Some possible actions are described below. The list of possible actions may be denoted as A.

Node p may compute local metrics for different possible actions (block 316). A local metric may indicate the performance of a node for a given action. For example, a local metric based on the utility function in equation (3) may indicate the overall rate achieved by node p for a particular action a and may be computed as follows:

$$U(p, a) = \sum_{S(t)=p} R(t, a), \quad \text{Eq (14)}$$

where R(t, a) is the rate achieved by UE t on all available resources for action a, and U(p, a) is a local metric for node p for action a.

The rate R(t, a) for each UE may be computed as shown in equations (8) and (9), where PSD(p, r) and PSD(q, r) may be dependent on the resource usage profiles for nodes p and q, respectively, associated with possible action a. In the design shown in equation (14), the rate for each UE on all available resources may first be determined, and the rates for all UEs served by node p may then be summed to obtain the local metric for node p. In another design, the rate for each UE on each available resource may first be determined, the rates for all UEs on each available resource may next be computed, and the rates for all available resources may then be summed to obtain the local metric for node p. The local metric for node p for each possible action may also be computed in other manners and may be dependent on the utility function.

The local metrics for different possible actions may be used by node p as well as the neighbor nodes to compute overall metrics for different possible actions. Node p may send its computed local metrics U(p, a), for a∈A, to the neighbor nodes (block 318). Node p may also receive local metrics U(q, a), for a∈A, from each neighbor node q in the neighbor set (block 320). Node p may compute overall metrics for different possible actions based on its computed local metrics and the received local metrics (block 322). For example, an overall metric based on the utility function in equation (3) may be computed for each possible action a, as follows:

$$V(a) = U(p, a) + \sum_{q \in NS(p) \setminus \{p\}} U(q, a), \quad \text{Eq (15)}$$

where V(a) is an overall metric for possible action a. The summation in equation (15) is over all nodes in the neighbor set except for node p.

After completing the metric computation, node p may select the action with the best overall metric (block 324). Each neighbor node may similarly compute overall metrics for different possible actions and may also select the action with the best overall metric. Node p and the neighbor nodes should select the same action if they operate on the same set of local metrics. Each node may then operate based on the selected action, without having to communicate with one another regarding the selected action. However, node p and its neighbor nodes may operate on different local metrics and may obtain different best overall metrics. This may be the case, for example, if node p and its neighbor nodes have different neighbor sets. In this case, node p may negotiate with the neighbor nodes to determine which action to take. This may entail exchanging overall metrics for some promising actions between the nodes and selecting the action that can provide good performance for as many nodes as possible.

Regardless of how the best action is selected, the selected action is associated with a specific resource usage profile for node p. Node p may utilize the available resources in accordance with the resource usage profile associated with the selected action (block 326). This resource usage profile may be defined by a specific list of transmit PSD levels, one transmit PSD level for each available resource. Node p may then use the specified transmit PSD level for each available resource.

There may be a large number of possible actions to evaluate for an exhaustive search to find the best action. In particular, if there are L possible transmit PSD levels for each resource, K available resources, and N nodes in the neighbor set, then the total number of possible actions, T, may be given as $T=L^{K \cdot N}$. Evaluating all T possible actions may be computationally intensive.

The number of possible actions to evaluate may be reduced in various manners. In one design, each available resource may be treated independently, and a given action may change the transmit PSD of only one resource. The number of possible actions may then be reduced to $T=(L^N) \cdot K$. In another design, the number of nodes that can adjust their transmit PSD on a given resource for a given action may be limited to Nx, which may be less than N. The number of possible actions may then be reduced to $T=(L^{Nx}) \cdot K$. In yet another design, the transmit PSD for a given resource may be either increased or decreased by one level at a time. The number of possible actions may then be reduced to $T=(2^{Nx}) \cdot K$. The number of possible actions may also be reduced via other simplifications.

In one design, a list of possible actions that may lead to good overall metrics may be evaluated. Possible actions that are unlikely to provide good overall metrics may be skipped in order to reduce computation complexity. For example, having both node p and a neighbor node increase their transmit PSD on the same resource will likely result in extra interference on the resource, which may degrade performance for both nodes. This possible action may thus be skipped.

Table 2 lists different types of actions that may be evaluated for adaptive resource partitioning, in accordance with one design.

TABLE 2

Action Types

| Action Type | Description |
|---|---|
| p-C-r | Node p claims resource r and increases its transmit PSD by one level on resource r. |
| p-B-r | Node p blanks resource r and decreases its transmit PSD by one level on resource r. |
| p-R-r-Q | Node p requests resource r from one or more neighbor nodes in set Q and asks the neighbor node(s) in set Q to decrease their transmit PSD by one level on resource r. |
| p-G-r-Q | Node p grants resource r to one or more neighbor nodes in set Q and tells the neighbor node(s) in set Q to increase their transmit PSD by one level on resource r. |
| p-CR-r-Q | Node p claims and requests resource r from one or more neighbor nodes in set Q and (i) increases its transmit PSD by one level on resource r and (ii) asks the neighbor node(s) in set Q to decrease their transmit PSD by one level on resource r. |
| p-BG-r-Q | Node p blanks and grants resource r to one or more neighbor nodes in set Q and (i) decreases its transmit PSD by one level on resource r and (ii) tells the neighbor node(s) in set Q to increase their transmit PSD by one level on resource r. |

Each action type in Table 2 may be associated with a set of possible actions of that type. For each action type involving only node p, K possible actions may be evaluated for the K available resources. For each action type involving both node p and one or more neighbor nodes in set Q, multiple possible actions may be evaluated for each available resource, with the number of possible actions being dependent on the size of the neighbor set, the size of set Q, etc. In general, set Q may include one or more neighbor nodes and may be limited to a small value (e.g., 2 or 3) in order to reduce the number of possible actions to evaluate.

Node p may compute a local metric for each possible action of each action type. Table 3 lists some local metrics that may be computed by node p for different types of actions listed in Table 2. The local metrics in Table 3 are for different possible actions on a given resource r. This coincides with the design in which each possible action is limited to one resource in order to reduce computation complexity.

TABLE 3

Local metrics

| Local metric | Description |
|---|---|
| $U_I(p, r)$ | Local metric for node p if it increases its transmit PSD on resource r by one level. |
| $U_D(p, r)$ | Local metric for node p if it decreases its transmit PSD on resource r by one level. |
| $U_{O/I}(p, q, r)$ | Local metric for node p if neighbor node q increases its transmit PSD on resource r by one level. |
| $U_{O/D}(p, q, r)$ | Local metric for node p if neighbor node q decreases its transmit PSD on resource r by one level. |
| $U_{I/D}(p, q, r)$ | Local metric for node p if it increases its transmit PSD on resource r by one level and neighbor node q decreases its transmit PSD on resource r by one level. |
| $U_{D/I}(p, q, r)$ | Local metric for node p if it decreases its transmit PSD on resource r by one level and neighbor node q increases its transmit PSD on resource r by one level. |
| $U_{O/I/D}(p, n, Q, r)$ | Local metric for node p if neighbor node n increases its transmit PSD on resource r by one level and one or more neighbor nodes in set Q decrease their transmit PSD on resource r by one level. |
| $U_{O/D/I}(p, n, Q, r)$ | Local metric for node p if neighbor node n decreases its transmit PSD on resource r by one level and one or more neighbor nodes in set Q increase their transmit PSD on resource r by one level. |

Local metrics $U_{O/I}(p, Q, r)$, $U_{O/D}(p, Q, r)$, $U_{I/D}(p, Q, r)$ and $U_{D/I}(p, Q, r)$ for a set of neighbor nodes, Q, may be defined in similar manner as local metrics $U_{O/I}(p, q, r)$, $U_{O/D}(p, q, r)$, $U_{I/D}(p, q, r)$ and $U_{D/I}(p, q, r)$, respectively, for a single neighbor node q. For example, $U_{O/I}(p, Q, r)$ may be the local metric for node p if all neighbor nodes in set Q increases their transmit PSD on resource r by one level.

Node p may compute local metrics for different possible actions based on (i) pilot measurements from UEs having node p in their active sets and (ii) the resource usage profiles for node p and neighbor nodes associated with these possible actions. For each possible action, node p may first compute the spectral efficiency SE(t, r) of each UE served by node p on each resource r, e.g., as shown in equation (9). The computation of the spectral efficiency R(t, r) may be dependent on a scheduling forecast to obtain the a(t, r) values for the UEs. PSD(p, r) and PSD(q, r) in equation (9) may be obtained from the resource usage profiles for nodes p and q, respectively. G(p, t) and G(q, t) in equation (9) may be obtained from pilot measurements from UE t for nodes p and q, respectively. A local metric for the possible action may then be computed based on the rates for all UEs on all available resources, e.g., as shown in equation (3) for the sum rate utility function.

The computation of the local metrics makes use of pilot measurements that are limited to nodes in the active sets of the UEs. Therefore, the accuracy of the local metrics may be affected by the $CoT_{min}$ threshold used to select nodes for inclusion in active sets, e.g., as shown in equation (1). A higher $CoT_{min}$ threshold may correspond to higher amount of ambient interference and lower accuracy of the local metrics. A higher $CoT_{min}$ threshold also corresponds to more relaxed requirements on UE measurement capability and a smaller active set. The $CoT_{min}$ threshold may be selected based on a trade off between UE requirements and complexity on one hand and metric computation accuracy on the other hand.

Node p may exchange local metrics with the neighbor nodes in the neighbor set (e.g., via the backhaul) to enable each node to compute overall metrics for different possible actions. In one design, local metrics for possible actions involving only node p (e.g., the first two local metrics in Table 3) may be sent to all neighbor nodes in the neighbor set. Local metrics for possible actions involving neighbor node q (e.g., the middle four local metrics in Table 3) may be sent to only node q. Local metrics for possible actions involving neighbor nodes in set Q (e.g., the last two local metrics in Table 3) may be sent to each node in set Q.

In one design, some local metrics (e.g., the first six local metrics in Table 3) may be computed periodically and exchanged between the nodes in the neighbor set, e.g., via standard resource negotiation messages. In one design, remaining local metrics (e.g., the last two local metrics in Table 3 and local metrics for set Q) may be computed when requested and exchanged via on-demand messages. The local metrics may be computed and exchanged between nodes in other manners.

Node p may compute local metrics for different possible actions and may also receive local metrics for different possible actions from neighbor nodes. Node p may compute overall metrics for different possible actions based on the computed local metrics and the received local metrics. Table 4 lists some overall metrics that may be computed by node p for different types of actions listed in Table 2.

TABLE 4

Overall Metrics

| Overall Metric | Description |
| --- | --- |
| $V_C(p, r)$ | Overall metric for a p-C-r action on resource r. |
| $V_B(p, r)$ | Overall metric for a p-B-r action on resource r. |
| $V_R(p, Q, r)$ | Overall metric for a p-R-r-Q action on resource r. |
| $V_G(p, Q, r)$ | Overall metric for a p-G-r-Q action on resource r. |
| $V_{CG}(p, Q, r)$ | Overall metric for a p-CG-r-Q action on resource r. |
| $V_{BG}(p, Q, r)$ | Overall metric for a p-BG-r-Q action on resource r. |

For clarity, the description below assumes a utility function in which an overall metric of a neighbor set for a possible action is equal to the sum of local metrics of all nodes in the neighbor set for the possible action. The computation of the overall metric may be modified accordingly for other types of utility function. For example, a summation for the overall metric may be replaced with a minimum operation for a utility function that minimizes a particular parameter.

In one design, an overall metric for a p-C-r action may be computed as follows:

$$V_C(p, r) = U_I(p, r) + \sum_{q \in NS(p) \setminus \{p\}} U_{O/I}(q, p, r), \text{ and} \quad \text{Eq (16)}$$

$$\Delta V_C(p,r) = V_C(p,r) - V(NS(p)), \quad \text{Eq (17)}$$

where $\Delta V_C(p, r)$ is a change in the overall metric for the p-C-r action, and $V(NS(p))$ is an overall metric for the current resource usage by the neighbor set.

As shown in equation (16), overall metric $V_C(p, r)$ may be computed based on local metric $U_I(p, r)$ computed by node p and local metric $U_{O/I}(q, p, r)$ received from neighbor nodes. As shown in equation (17), the change in the overall metric may be computed and used instead of the absolute value from equation (16).

In one design, an overall metric for a p-B-r action may be computed as follows:

$$V_B(p, r) = U_D(p, r) = \sum_{q \in NS(p) \setminus \{p\}} U_{O/D}(q, p, r), \text{ and} \quad \text{Eq (18)}$$

$$\Delta V_B(p, r) = V_B(p, r) - V(NS(p)), \quad \text{Eq (19)}$$

where $\Delta V_B(p, r)$ is a change in the overall metric for the p-B-r action.

As shown in equation (18), overall metric $V_B(p, r)$ may be computed based on local metrics $U_D(p, r)$ computed by node p and local metrics $U_{O/D}(q, p, r)$ received from neighbor nodes. Node p may exchange overall metrics $V_C(p, r)$ and $V_B(p, r)$ (or the corresponding $\Delta V_C(p, r)$ and $\Delta V_B(p, r)$) with neighbor nodes for use in computing other overall metrics.

In one design, an overall metric for a p-G-r-Q action may be computed as follows. First, an initial estimate of the overall metric may be computed as follows:

$$V_{G,0}(p, Q, r) = U_{O/I}(p, Q, r) + \sum_{q \in Q} \{V_C(q, r) - U_{O/I}(p, q, r)\}, \quad \text{Eq (20)}$$

and $$\Delta V_{G,0}(p, Q, r) = V_{G,0}(p, Q, r) - U(p) - \sum_{q \in Q} \{V(NS(q)) - U(p)\}, \quad \text{Eq (21)}$$

where $U(p)$ is a local metric for node p for the current resource usage, $V_{G,0}(p, Q, r)$ is an initial estimate of the overall metric for a p-G-r-Q action, and $\Delta V_{G,0}(p, Q, r)$ is an initial estimate of the change in the overall metric.

As shown in equation (20), $V_{G,0}(p, Q, r)$ may be computed based on local metrics $U_{O/I}(p, q, r)$ and $U_{O/I}(p, Q, r)$ computed by node p and overall metrics $V_C(q, r)$ received from neighbor nodes. If the initial estimate seems promising (e.g., if the change in the overall metric is larger than a threshold), then the overall metric may be more accurately computed as follows:

$$V_G(p, Q, r) = \quad \text{Eq (22)}$$
$$\sum_{n \in NS(p)} U_{O/I}(n, Q, r) + \sum_{q \in Q} \left( V_C(q, r) - \sum_{n \in N1} U_{O/I}(n, q, r) \right),$$

$$\Delta V_G(p, Q, r) = \quad \text{Eq (23)}$$
$$V_G(p, Q, r) - V(NS(p)) - \sum_{q \in Q} \left( V(NS(q)) - \sum_{n \in N1} U(n) \right),$$

where $\Delta V_G(p, Q, r)$ is the change in the overall metric for the p-G-r-Q action, and $N1 = NS(p) \cap NS(q)$.

In one design, node p may request for local metrics $U_{O/I}(n, q, r)$ and $U_{O/I}(n, Q, r)$ in equation (22) from the neighbor nodes only if the initial estimate seems promising. This design may reduce the amount of information to exchange via the backhaul for adaptive resource partitioning.

In one design, an overall metric for a p-R-r-Q action may be computed in similar manner as an overall metric for a p-G-r-Q action. Equations (18) to (21) may be used to compute the overall metric for the p-R-r-Q action, albeit with local metrics $U_{O/I}(p, q, r)$, $U_{O/I}(p, Q, r)$, $U_{O/I}(n, q, r)$ and $U_{O/I}(n, Q, r)$ being replaced with local metrics $U_{O/D}(p, q, r)$, $U_{O/D}(p, Q, r)$, $U_{O/D}(n, q, r)$ and $U_{O/D}(n, Q, r)$, respectively.

In one design, an overall metric for a p-BG-r-Q action may be computed as follows. First, an initial estimate of the overall metric may be computed as follows:

$$V_{BG,0}(p, Q, r) = U_{D/I}(p, Q, r) + \sum_{n \in N2} U_{O/D}(n, p, r) + \qquad \text{Eq (24)}$$

$$\sum_{q \in Q} \{U_{I/D}(q, p, r) + V_C(p, r) - U_I(q, r) - U_{O/I}(p, q, r)\},$$

$$\Delta V_{BG,0}(p, Q, r) = \qquad \text{Eq (25)}$$

$$V_{BG,0}(p, Q, r) - V(NS(p)) - \sum_{q \in Q} \{V(NS(q)) - U(p) - U(q)\}$$

where $V_{BG,0}(p, Q, r)$ is an initial estimate of the overall metric for a p-BG-r-Q action, $\Delta V_{BG,0}(p, Q, r)$ is an initial estimate of the change in the overall metric, and $N2 = NS(p) \setminus (Q \cup \{p\})$.

As shown in equation (24), $V_{BG,0}(p, Q, r)$ may be computed based on (i) local metrics $U_{O/I}(p, q, r)$ and $U_{D/I}(p, Q, r)$ computed by node p and (ii) local metrics $U_I(q, r)$, $U_{O/D}(n, p, r)$ and $U_{I/D}(q, p, r)$ and overall metric $V_C(q, r)$ received from neighbor nodes. If the initial estimate seems promising, then the overall metric may be more accurately computed as follows:

$$V_{BG}(p, Q, r) = \qquad \text{Eq (26)}$$

$$\sum_{n \in NS(p)} U_{O/D/I}(n, p, Q, r) + \sum_{q \in Q} \left( V_C(q, r) - \sum_{n \in N1} U_{O/I}(n, q, r) \right),$$

$$\Delta V_{BG}(p, Q, r) = \qquad \text{Eq (27)}$$

$$V_{BG}(p, Q, r) - V(NS(p)) - \sum_{q \in Q} \left( V(NS(q)) - \sum_{n \in N1} U(n) \right),$$

where $\Delta V_{BG}(p, Q, r)$ is a change in the overall metric for the p-BG-r-Q action. Node p may request for local metrics $U_{O/I}(n, q, r)$ and $U_{O/D/I}(n, p, Q, r)$ in equation (26) from the neighbor nodes if the initial estimate seems promising.

In one design, an overall metric for a p-CR-r-Q action may be computed in similar manner as an overall metric for a p-BG-r-Q action. Equations (24) to (27) may be used to compute the overall metric for the p-CR-r-Q action, e.g., with local metrics $U_{O/I}(n, q, r)$ and $U_{O/D/I}(n, p, Q, r)$ in equation (26) being replaced with $U_{O/D}(n, q, r)$ and $U_{O/I/D}(n, p, Q, r)$, respectively.

Equations (16) through (27) show exemplary computations for the overall metrics in Table 4, which are for the different types of actions in Table 2. Some overall metrics may be computed based solely on local metrics, e.g., as shown in equations (16) and (18). Some other overall metrics may be computed based on a combination of local metrics and overall metrics, e.g., as shown in equations (22) and (26). The use of some overall metrics to compute other overall metrics may simplify computation. In general, an overall metric may be computed based solely on local metrics or based on both local metrics and other overall metrics. The nodes may exchange local metrics and/or overall metrics via one or more rounds of messages.

The overall metrics may also be computed in other manners, e.g., based on other equations, other local metrics, etc. In general, any set of action types may be supported. The overall metrics may be computed for the support action types and may be defined in various manners.

Adaptive resource partitioning for a small wireless network with nodes of two power classes was simulated. In the simulation, a neighbor set includes two nodes for macro base stations (or macro nodes) and six nodes for pico base stations (or pico nodes). Each macro node has three PSD levels—a nominal PSD level of 43 dBm (denoted as 2), a low PSD level of 33 dBm (denoted as 1), and zero PSD level (denoted as 0). Each pico node has two PSD levels—a nominal PSD level of 33 dBm (denoted as 1) and zero PSD level (denoted as 0). A total of four resources are available for partitioning between the nodes. A total of 16 UEs are distributed throughout the wireless network.

Figure 4:
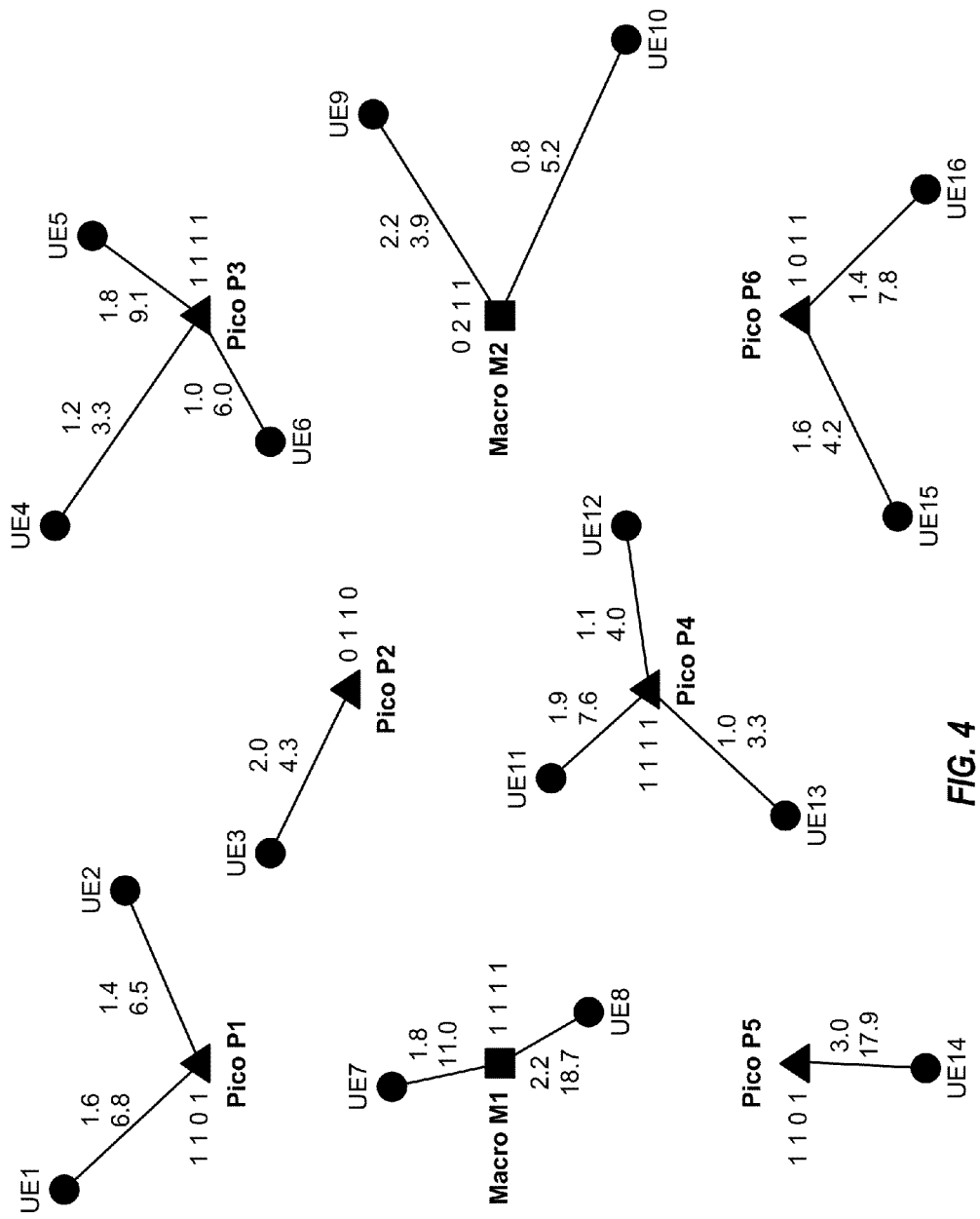
FIG. 4 shows a wireless network with adaptive resource partitioning.

FIG. 4 shows the wireless network in the simulation. The two macro nodes are denoted as M1 and M2, the four pico nodes are denoted as P1 through P4, and the 16 UEs are denoted as UE1 through UE16. FIG. 4 also shows the result of the adaptive resource partitioning based on the adaptive algorithm described above. Next to each node is a set of four numbers indicative of the transmit PSD levels on the four available resources for the node. For example, macro node M2 is associated with '0211', which means that zero transmit PSD is used on resource 1, 43 dBm is used on resource 2, 33 dBm is used on resource 3, and 33 dBm is used on resource 4.

FIG. 4 also shows a communication link between each UE and its serving node. The communication link for each UE is labeled with two numbers. The top number indicates the total fraction of the resources assigned to the UE. The bottom number indicates the total rate R(t) achieved by the UE. For example, the communication link from UE9 to macro node M2 indicates that UE9 is assigned 2.2 out of three resources on average and achieves a rate of 3.9 Mbps. For each node, the sum of the resources assigned to all UEs served by that node should be equal to the resources allocated to the node by the adaptive resource partitioning.

Table 5 lists the performance of adaptive resource partitioning as well as the performance of a number of fixed resource partitioning schemes. For a fixed X:Y partitioning, X resources are allocated to macro nodes, and Y resources are allocated to pico nodes, and each node uses the nominal PSD level on each resource allocated to that node, where X+Y=4 for the example shown in FIG. 4. For the adaptive resource partitioning, each node may be allocated a configurable number of resources, and each macro node may transmit at 43 dBm or 33 dBm on each allocated resource.

Table 5 shows three overall metrics for the different resource partitioning schemes. A log log IU overall metric is based on the utility function shown in equation (6). A minimum rate overall metric (Rmin) is based on the utility function shown in equation (4). A sum rate overall metric (Rsum) is based on the utility function shown in equation (3). As shown in Table 5, the adaptive resource partitioning may provide better performance than the fixed resource partitioning schemes.

TABLE 5

| Resource Partitioning Scheme | log log IU | Rmin | Rsum | Units |
| --- | --- | --- | --- | --- |
| Adaptive Resource Partitioning | 6.37 | 3.29 | 119.64 | Mbps |
| Fixed 1:3 Partitioning | 4.85 | 1.73 | 92.81 | Mbps |
| Fixed 2:2 Partitioning | 4.23 | 1.15 | 87.56 | Mbps |
| Fixed 3:1 Partitioning | 2.72 | 0.58 | 82.33 | Mbps |

In one design, adaptive resource partitioning may be performed for all resources available for transmission in a wireless network. In another design, adaptive resource partitioning may be performed for a subset of the available resources. For example, macro nodes may be allocated a first subset of resources, and pico nodes may be allocated a second subset of resources based on fixed resource partitioning. The remaining available resources may be dynamically allocated to the macro nodes or pico nodes based on adaptive resource partitioning. For the example shown in FIG. 4, the macro nodes may be assigned one resource, the pico nodes may be assigned one resource, and two remaining resources may be dynamically allocated to the macro nodes or the pico nodes based on adaptive resource partitioning. This design may reduce computation complexity.

For clarity, adaptive resource partitioning for the downlink has been described above. Adaptive resource partitioning for the uplink may be performed in a similar manner. In one design, a set of target interference-over-thermal (IoT) levels may be used for resource partitioning on the uplink in similar manner as the set of PSD levels for the downlink. One target IoT level may be selected for each resource on the uplink, and transmissions from each UE on each resource may be controlled so that the actual IoT on that resource at each neighbor node in the active set of the UE is at or below the target IoT level for that resource at the neighbor node. A utility function may be defined to quantify performance of data transmission on the uplink and may be a function of sum of user rates, or minimum of user rates, etc. The rate of each UE on the uplink may be a function of transmit power, channel gain, and target IoT level, etc. Local metrics and overall metrics may be computed for different possible actions based on the utility function. Each possible action may be associated with a list of target IoT levels for all available resources for each node in a neighbor set. The possible action with the best overall metric may be selected for use.

Figure 5:
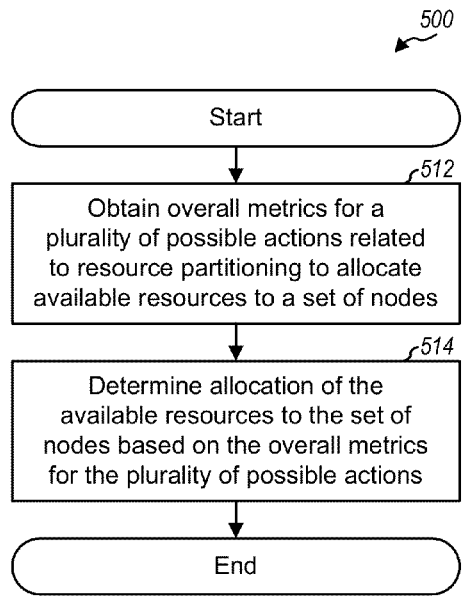
FIG. 5 shows a process for supporting communicating.

FIG. 5 shows a design of a process 500 for supporting communication. Process 500 may be performed by a node (as described below) or by some other entity (e.g., a network controller). The node may be a base station, a relay, or some other entity. The node may obtain overall metrics for a plurality of possible actions related to resource partitioning to allocate available resources to a set of nodes that includes the node (block 512). Each possible action may be associated with a set of resource usage profiles for the set of nodes, one resource usage profile for each node. Each resource usage profile may indicate allowed usage of the available resources by a particular node. The node may determine allocation of the available resources to the set of nodes based on the overall metrics for the plurality of possible actions (block 514).

The available resources may be for time units, frequency units, time-frequency units, etc. In one design, the available resources may be for the downlink. In this design, each node in the set of nodes may be associated with a set of transmit PSD levels allowed for that node. Each resource usage profile may comprise a list of transmit PSD levels for the available resources, one transmit PSD level for each available resource. The transmit PSD level for each available resource may be one of the set of transmit PSD levels. In another design, the available resources may be for the uplink. In this design, each resource usage profile may comprise a list of target IoT levels for the available resources, one target IoT level for each available resource.

In one design of block 514, the node may select one of the plurality of possible actions based on the overall metrics for these possible actions. The node may determine resources allocated to the node based on a resource usage profile associated with the selected action and applicable for the node. The node may schedule data transmission for at least one UE on the available resources based on the resource usage profile for the node.

Figure 6:
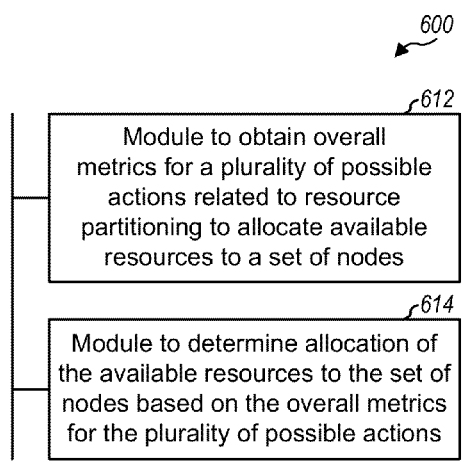
FIG. 6 shows an apparatus for supporting communicating.

FIG. 6 shows a design of an apparatus 600 for supporting communication. Apparatus 600 includes a module 612 to obtain overall metrics for a plurality of possible actions related to resource partitioning to allocate available resources to a set of nodes, and a module 614 to determine allocation of the available resources to the set of nodes based on the overall metrics for the plurality of possible actions.

Figure 7:
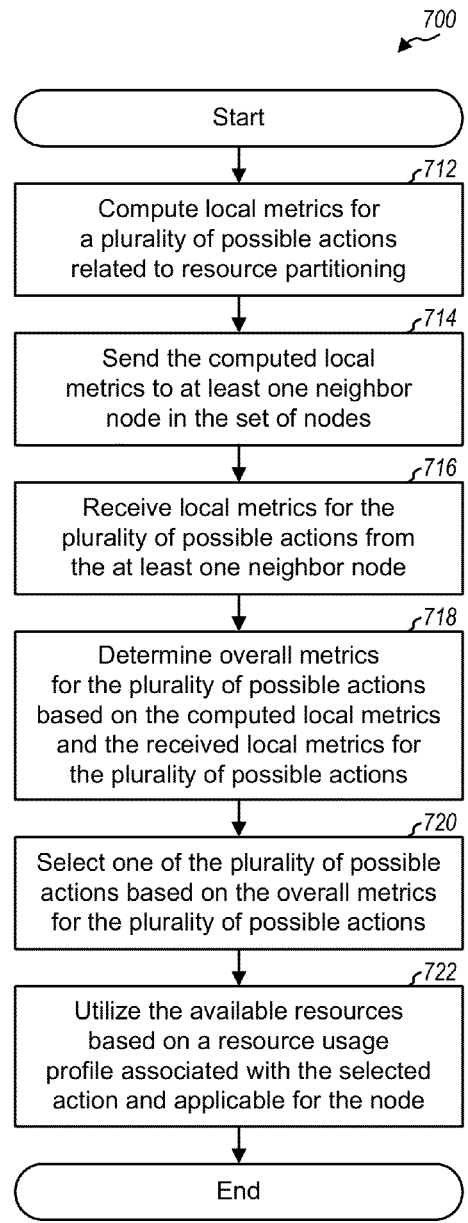
FIG. 7 shows a process for performing adaptive resource partitioning

FIG. 7 shows a design of a process 700 for performing adaptive resource partitioning, which may be used for blocks 512 and 514 in FIG. 5. A node may compute local metrics for a plurality of possible actions related to resource partitioning to allocate available resources to a set of nodes that includes the node (block 712). The node may send the computed local metrics to at least one neighbor node in the set of nodes to enable the neighbor node(s) to compute overall metrics for the plurality of possible actions (block 714). The node may receive local metrics for the plurality of possible actions from the at least one neighbor node (block 716). The node may determine overall metrics for the plurality of possible actions based on the computed local metrics and the received local metrics for these possible actions (block 718). A local metric for a possible action may be indicative of the performance achieved by a node for the possible action. An overall metric for a possible action may be indicative of the overall performance achieved by the set of nodes for the possible action.

The node may select one of the plurality of possible actions based on the overall metrics for the plurality of possible actions, e.g., select the action with the best overall metric (block 720). The node may utilize the available resources based on a resource usage profile associated with the selected action and applicable for the node (block 722).

In one design of block 712, for each possible action, the node may determine at least one rate for at least one UE communicating with the node based on (i) the set of resource usage profiles associated with the possible action and (ii) channel gains between each UE and the node as well as the neighbor node(s). The node may then determine a local metric for the possible action based on the at least one rate. The local metrics for the plurality of possible actions may be computed based on a function of rate, or latency, or queue size, or some other parameter, or a combination thereof. The local metrics for the plurality of possible actions may also be computed based on a function of sum of rates, or minimum of rates, or sum of quantities determined based on rates, etc.

In one design of blocks 714 and 716, a first subset of the computed local metrics and a first subset of the received local metrics may be exchanged between the node and the at least one neighbor node periodically. A second subset of the computed local metrics and a second subset of the received local metrics may be exchanged between the node and the at least one neighbor node when requested.

In one design of block 718, for each possible action, the node may combine a local metric computed by the node for the possible action with at least one local metric received from the at least one neighbor node for the possible action to obtain an overall metric for that possible action.

In one design, each of the plurality of possible actions may affect only one of the available resources. In another design, each possible action may change transmit PSD (or target IoT) by at most one level for any given node in the set of nodes. In one design, a set of action types may be supported, e.g., as shown in Table 2. Each of the plurality of possible actions may be of one of the set of action types. The plurality of possible actions may comprise (i) first possible actions for the node increasing its transmit PSD, (ii) second possible actions for the node decreasing its transmit PSD, (iii) third possible actions for one or more neighbor nodes increasing their transmit PSD, (iv) fourth possible actions for the one or more neighbor nodes decreasing their transmit PSD, (v) fifth possible actions for the node increasing its transmit PSD and the one or more neighbor nodes decreasing their transmit PSD, (vi) sixth possible actions for the node decreasing its transmit PSD and the one or more neighbor nodes increasing their transmit PSD, or (vii) a combination thereof.

In one design, each UE may be associated with an active set of nodes having received signal quality or received signal strength above a threshold. The set of nodes may be determined based on active sets of UEs and may include (i) nodes in active sets of UEs communicating with the node and/or (ii) nodes serving UEs having active sets that include the node. In one design, the set of nodes may include nodes of different power classes. For example, the set may include a first node with a first maximum transmit power level and a second node with a second/different maximum transmit power level. In another design, the set of nodes may include nodes of the same power class.

The description above is for a distributed design in which the nodes in the set of nodes may each compute and exchange local metrics and overall metrics for different possible actions. For a centralized design, a designated entity may compute local metrics and overall metrics for different possible actions and may select the best action.

FIG. 8 shows a design of a process 800 for communicating in a wireless network with adaptive resource partitioning. Process 800 may be performed by a UE (as described below) or by some other entity. The UE may make pilot measurements for nodes detectable by the UE (block 812). The pilot measurements may be used to determine an active set for the UE. The pilot measurements may also be used to compute local metrics for adaptive resource partitioning.

The UE may receive an assignment of at least one resource from a node (block 814). Adaptive resource partitioning may be performed to allocate available resources to a set of nodes that includes the node. The node may be allocated a subset of the available resources by the adaptive resource partitioning. The at least one resource assigned to the UE may be from the subset of the available resources allocated to the node.

The UE may communicate with the node on the at least one resource (block 816). In one design of block 816, the UE may receive data transmission on the at least one resource from the node. The data transmission may be sent by the node on each of the at least one resource at a transmit PSD level allowed for the node on the resource. In another design of block 816, the UE may send data transmission on the at least one resource to the node. The data transmission may be sent by the UE on each of the at least one resource at a transmit power level determined based on at least one target IoT level for at least one neighbor node on the resource.

FIG. 9 shows a design of an apparatus 900 for communicating in a wireless network with adaptive resource partitioning. Apparatus 900 includes a module 912 to make pilot measurements for nodes detectable by a UE, a module 914 to receive an assignment of at least one resource from a node at the UE, and a module 916 to communicate with the node by the UE on the at least one resource.

The modules in FIGS. 6 and 9 may comprise processors, electronic devices, hardware devices, electronic components, logical circuits, memories, software codes, firmware codes, etc., or any combination thereof.

Figure 10:
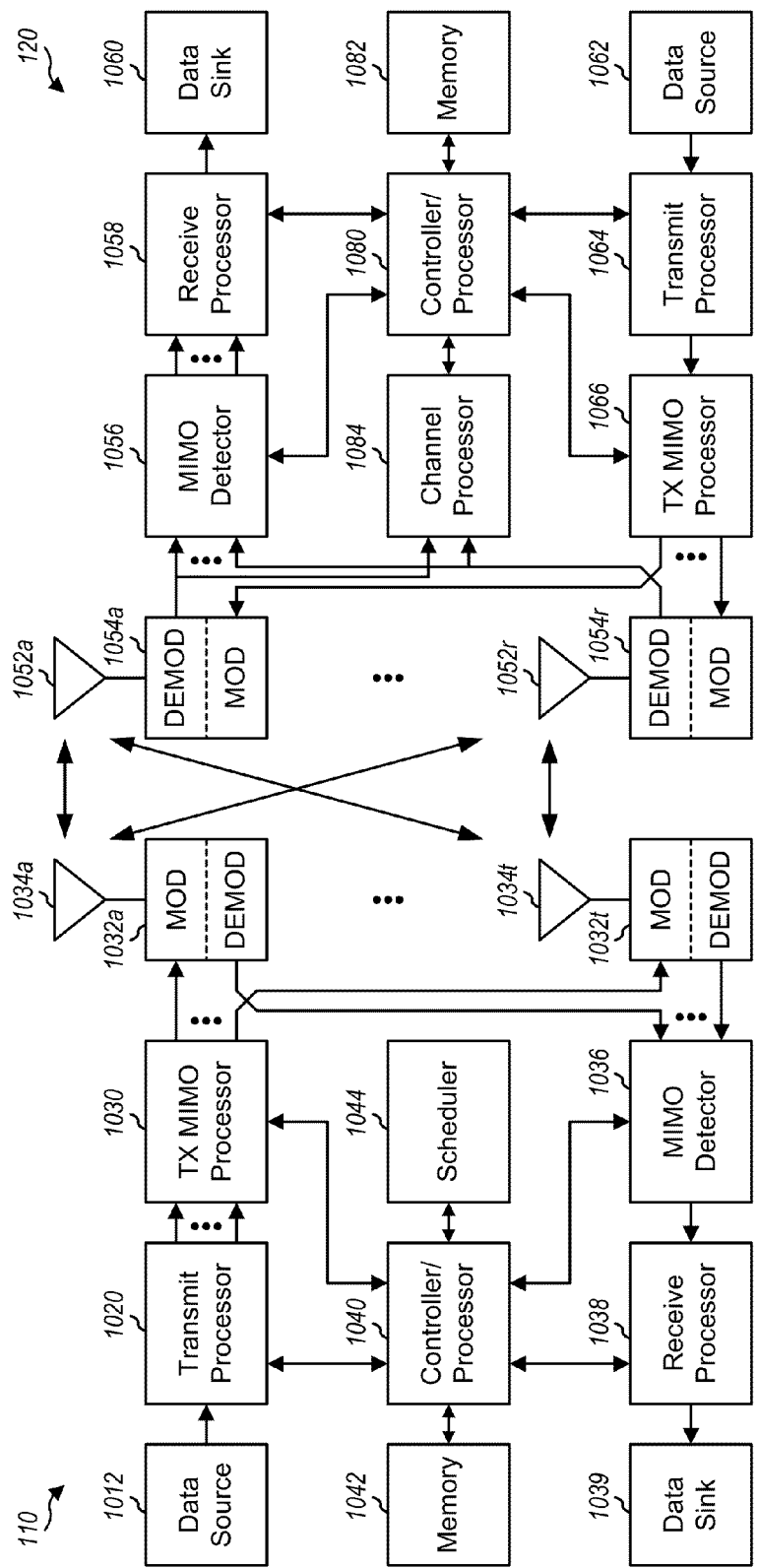
FIG. 10 shows a block diagram of a base station and a UE.

FIG. 10 shows a block diagram of a design of a base station/node 110 and a UE 120, which may be one of the base stations and one of the UEs in FIG. 1. Base station 110 may be equipped with T antennas 1034a through 1034t, and UE 120 may be equipped with R antennas 1052a through 1052r, where in general T≥1 and R≥1.

At base station 110, a transmit processor 1020 may receive data from a data source 1012 for one or more UEs and control information from a controller/processor 1040. Processor 1020 may process (e.g., encode, interleave, and modulate) the data and control information to obtain data symbols and control symbols, respectively. Processor 1020 may also generate pilot symbols for pilot or reference signal. A transmit (TX) multiple-input multiple-output (MIMO) processor 1030 may perform spatial processing (e.g., precoding) on the data symbols, the control symbols, and/or the pilot symbols, if applicable, and may provide T output symbol streams to T modulators (MODs) 1032a through 1032t. Each modulator 1032 may process a respective output symbol stream (e.g., for OFDM, etc.) to obtain an output sample stream. Each modulator 1032 may further process (e.g., convert to analog, amplify, filter, and upconvert) the output sample stream to obtain a downlink signal. T downlink signals from modulators 1032a through 1032t may be transmitted via T antennas 1034a through 1034t, respectively.

At UE 120, antennas 1052a through 1052r may receive the downlink signals from base station 110 and may provide received signals to demodulators (DEMODs) 1054a through 1054r, respectively. Each demodulator 1054 may condition (e.g., filter, amplify, downconvert, and digitize) its received signal to obtain input samples. Each demodulator 1054 may further process the input samples (e.g., for OFDM, etc.) to obtain received symbols. A MIMO detector 1056 may obtain received symbols from all R demodulators 1054a through 1054r, perform MIMO detection on the received symbols if applicable, and provide detected symbols. A receive processor 1058 may process (e.g., demodulate, deinterleave, and decode) the detected symbols, provide decoded data for UE 120 to a data sink 1060, and provide decoded control information to a controller/processor 1080.

On the uplink, at UE 120, a transmit processor 1064 may receive and process data from a data source 1062 and control information from controller/processor 1080. Processor 1064 may also generate pilot symbols for pilot or reference signal. The symbols from transmit processor 1064 may be precoded by a TX MIMO processor 1066 if applicable, further processed by modulators 1054a through 1054r (e.g., for SC-FDM, OFDM, etc.), and transmitted to base station 110. At base station 110, the uplink signals from UE 120 may be received by antennas 1034, processed by demodulators 1032, detected by a MIMO detector 1036 if applicable, and further processed by a receive processor 1038 to obtain decoded data and control information sent by UE 120. Processor 1038 may provide the decoded data to a data sink 1039 and the decoded control information to controller/processor 1040.

Controllers/processors 1040 and 1080 may direct the operation at base station 110 and UE 120, respectively. A channel processor 1084 may make pilot measurements, which may be used to determine an active set for UE 120 and to compute channel gains, rates, metrics, etc. Processor 1040 and/or other processors and modules at base station 110 may perform or direct process 300 in FIG. 3, process 500 in FIG. 5, process 700 in FIG. 7, and/or other processes for the techniques described herein. Processor 1080 and/or other processors and modules at UE 120 may perform or direct process 800 in FIG. 8 and/or other processes for the techniques described herein. Memories 1042 and 1082 may store data and program codes for base station 110 and UE 120, respectively. A scheduler 1044 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    determining, at a serving node for a first user equipment (UE), an active set of nodes maintained for the first UE;
    determining a neighboring set of nodes, wherein the neighboring set of nodes comprises at least one node, excluding the serving node, that signals or interferes with terminals being served by the serving node, or serves at least one UE that is signaled or is interfered with by transmissions from the serving node;
    determining a resource usage profile for the serving node for serving a first set of UEs comprising the first UE based at least in part on achievable user transmission rates for the first set of UEs and one or more performance metrics from the at least one node of the neighboring set of nodes, wherein the one or more performance metrics are associated with a second set of UEs served by the at least one node; and
    transmitting at least one data transmission to one or more UEs of the first set of UEs based on the resource usage profile.

2. The method of claim 1, wherein determining the active set further comprises:
    including a node in the active set of nodes responsive to a pilot measurement for the node exceeding a carrier-over-thermal (CoT) threshold.

3. The method of claim 1, wherein determining the resource usage profile comprises:
    evaluating a utility function based at least in part on the achievable user transmission rates for the first set of UEs; and
    receiving the one or more performance metrics from the one or more nodes of the neighboring set of nodes, wherein the one or more performance metrics are based at least in part on the utility function evaluated for respective sets of UEs served by the one or more nodes.

4. The method of claim 3, wherein the utility function is based on a sum of the achievable user transmission rates.

5. The method of claim 3, further comprising:
calculating the achievable user transmission rates based on an estimated fraction of each of a set of available resources assigned to the first set of UEs and a spectral efficiency of each UE of the first set of UEs for the each of the set of available resources.

6. The method of claim 5, further comprising:
calculating the achievable user transmission rates for the each UE of the first set of UEs based on a bandwidth of each resource of the set of available resources.

7. The method of claim 5, further comprising:
calculating the spectral efficiency of the each UE for the each of the set of available resources based at least in part on a power spectral density (PSD) of the serving node on the each of the set of available resources.

8. The method of claim 7, further comprising:
calculating the spectral efficiency of the each UE for the each of the set of available resources based at least in part on a power spectral density (PSD) of a neighboring node on the each of the set of available resources.

9. The method of claim 7, further comprising:
calculating the spectral efficiency of the each UE for the each of the set of available resources based at least in part on a channel gain between the serving node and the each UE.

10. The method of claim 7, further comprising:
calculating the spectral efficiency of the each UE for the each of the set of available resources based at least in part on a capacity function.

11. The method of claim 3, further comprising:
applying a pre-scheduler to maximize the utility function over an estimated fraction of each available resource assigned to the first set of UEs.

12. The method of claim 3, wherein determining the resource usage profile comprises:
obtaining the one or more performance metrics for a plurality of resource partitioning actions; and
evaluating the one or more performance metrics for the plurality of resource partitioning actions.

13. The method of claim 3, wherein determining the resource usage profile comprises obtaining the one or more performance metrics for at least one of a plurality of resource partitioning actions, the resource partitioning actions comprising one or more of increasing a transmit power spectral density (PSD) of a resource, decreasing the transmit PSD of the resource, requesting the resource from a node in the neighboring set of nodes, requesting that the node in the neighboring set of nodes decrease the transmit PSD on the resource, indicating to the node in the neighboring set of nodes to increase the transmit PSD on the resource, granting the resource to the node in the neighboring set of nodes, or a combination thereof.

14. The method of claim 3, wherein the utility function is based on a minimum user transmission rate of the achievable user transmission rates.

15. The method of claim 3, wherein the utility function is based on at least one of a sum of logs of the achievable user transmission rates, a sum of logs of the logs of the achievable user transmission rates, or a combination thereof.

16. The method of claim 3, wherein the utility function is based on a sum of minus one divided by a cube of the achievable user rates.

17. An apparatus for wireless communication, comprising:
means for determining, at a serving node for a first user equipment (UE), an active set of nodes maintained for the first UE;
means for determining a neighboring set of nodes, wherein the neighboring set of nodes comprises at least one node, excluding the serving node, that signals or interferes with terminals being served by the serving node, or serves at least one UE that is signaled or is interfered with by transmissions from the serving node;
means for determining a resource usage profile for the serving node for serving a first set of UEs comprising the first UE based at least in part on achievable user transmission rates for the first set of UEs and one or more performance metrics from the at least one node of the neighboring set of nodes, wherein the one or more performance metrics are associated with a second set of UEs served by the at least one node; and
transmitting at least one data transmission to one or more UEs of the first set of UEs based on the resource usage profile.

18. The apparatus of claim 17, wherein the means for determining the active set further comprises:
means for including a node in the active set of nodes responsive to a pilot measurement for the node exceeding a carrier-over-thermal (CoT) threshold.

19. The apparatus of claim 17, wherein means for determining the resource usage profile comprises:
means for evaluating a utility function based at least in part on the achievable user transmission rates for the first set of UEs; and
means for receiving the one or more performance metrics from the one or more nodes of the neighboring set of nodes, the one or more performance metrics are based at least in part on the utility function evaluated for respective sets of UEs served by the one or more nodes.

20. The apparatus of claim 19, wherein the utility function is further based on at least one of a sum of the achievable user transmission rates, a minimum user rate of the achievable user transmission rates, a sum of logs of the achievable user transmission rates, a sum of logs of the logs of the achievable user transmission rates, or a sum of minus one divided by a cube of the achievable user transmission rates, or a combination thereof.

21. The apparatus of claim 19, further comprising:
means for calculating the achievable user transmission rates based at least in part on at least one of an estimated fraction of each of a set of available resources assigned to the first set of UEs, a spectral efficiency of each UE of the first set of UEs for the each of the set of available resources, or a bandwidth of the each of the set of available resources, or a combination thereof.

22. The apparatus of claim 21, further comprising:
means for calculating the spectral efficiency of the each UE for the each of the set of available resources based at least in part on one or more of a power spectral density (PSD) of the serving node on each available resource, a PSD of a neighboring node on the each of the set of available resources, a channel gain between the serving node and the each UE, a capacity function, or a combination thereof.

23. The apparatus of claim 19, further comprising:
means for applying a pre-scheduler to maximize the utility function over an estimated fraction of each available resource assigned to the first set of UEs.

24. The apparatus of claim 19, wherein the means for determining the resource usage profile comprises:
means for obtaining the one or more performance metrics for a plurality of resource partitioning actions; and
means for evaluating the one or more performance metrics for the plurality of resource partitioning actions.

25. The apparatus of claim 19, wherein the means for determining the resource usage profile obtains the one or more performance metrics for at least one of a plurality of resource partitioning actions, the resource partitioning actions comprising one or more of increasing a transmit power spectral density (PSD) of a resource, decreasing the transmit PSD of the resource, requesting the resource from a node in the neighboring set of nodes, requesting that the node in the neighboring set of nodes decrease the transmit PSD on the resource, indicating to the node in the neighboring set of nodes to increase the transmit PSD on the resource, granting the resource to the node in the neighboring set of nodes, or a combination thereof.

26. A computer program product, comprising:
a non-transitory computer-readable medium comprising:
  code for determining, at a serving node for a first user equipment (UE), an active set of nodes maintained for the first UE;
  code for determining a neighboring set of nodes, wherein the neighboring set of nodes comprises at least one node, excluding the serving node, that signals or interferes with terminals being served by the serving node, or serves at least one UE that is signaled or is interfered with by transmissions from the serving node;
  code for determining a resource usage profile for the serving node for serving a first set of UEs comprising the first UE based at least in part on achievable user transmission rates for the first set of UEs and one or more performance metrics from at least one node of the neighboring set of nodes, wherein the one or more performance metrics are associated with a second set of UEs served by the at least one node; and
  code for transmitting at least one data transmission to one or more UEs of the first set of UEs based on the resource usage profile.

27. An apparatus for wireless communication, comprising:
a memory;
at least one processor coupled to the memory, and configured to:
  determine, at a serving node for a first user equipment (UE), an active set of nodes maintained for the first UE,
  determine a neighboring set of nodes, wherein the neighboring set of nodes comprises at least one node, excluding the serving node, that signals or interferes with terminals being served by the serving node, or serves at least one UE that is signaled or is interfered with by transmissions from the serving node;
  determine a resource usage profile for the serving node for serving a first set of UEs comprising the first UE based at least in part on achievable user transmission rates for the first set of UEs and one or more performance metrics of one or more nodes of the neighboring set of nodes, wherein the one or more performance metrics are associated with a second set of UEs served by the at least one node; and
  transmit at least one data transmission to one or more UEs of the first set of UEs based on the resource usage profile.

* * * * *